US012577041B2

(12) United States Patent
Shin et al.

(10) Patent No.: US 12,577,041 B2
(45) Date of Patent: Mar. 17, 2026

(54) FOOD WASTE DISPOSER INCLUDING DOOR

(71) Applicant: Samsung Electronics Co., Ltd., Suwon-si (KR)

(72) Inventors: Hojin Shin, Suwon-si (KR); Namsoo Park, Suwon-si (KR); Youngkyun Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 136 days.

(21) Appl. No.: 18/349,002

(22) Filed: Jul. 7, 2023

(65) Prior Publication Data

US 2024/0116704 A1 Apr. 11, 2024

Related U.S. Application Data

(63) Continuation of application No. PCT/KR2023/008364, filed on Jun. 16, 2023.

(30) Foreign Application Priority Data

Oct. 6, 2022 (KR) ........................ 10-2022-0127648

(51) Int. Cl.
*B65F 1/16* (2006.01)

(52) U.S. Cl.
CPC ........ *B65F 1/1638* (2013.01); *B65F 2210/20* (2013.01)

(58) Field of Classification Search
CPC ..... A47G 29/14; A47G 29/141; B65F 1/1638; B65F 1/14; B65F 2210/20; B65F 2210/12;

(Continued)

(56) References Cited

U.S. PATENT DOCUMENTS 5,329,212 A * 7/1994 Feigleson ............. B65F 1/1638 318/16
6,211,637 B1 * 4/2001 Studer ................... B65F 1/1638 318/16

(Continued)

FOREIGN PATENT DOCUMENTS

JP H07-061501 A 3/1995
JP H08276172 A * 10/1996

(Continued)

OTHER PUBLICATIONS

International Search Report and Written Opinion of the International Searching Authority dated Sep. 15, 2023, in connection with International Application No. PCT/KR2023/008364, 10 pages.

*Primary Examiner* — William L Miller

(57) ABSTRACT

According to an embodiment, a food waste disposer includes a housing having an opening formed on one end thereof, and a door coupled by hinge to open or close the opening of the housing. The door includes a door lever configured to be insertable into a fixing groove provided adjacent to the opening of the housing, a holder lever coupled to the door lever and configured to rotate about a rotation shaft, a pulling member configured to transmit a physical external force applied from the outside to the holder lever such that the holder lever rotates about the rotation shaft, one end of the pulling member being connected to the holder lever, and an actuator configured to generate a force to rotate the holder lever about the rotation shaft, based on an electrical signal.

20 Claims, 15 Drawing Sheets

(58) Field of Classification Search
CPC .......... B65F 2210/129; B65F 2210/137; B65F 2210/148; B65F 2210/168; B65F 2210/181; B65F 2210/128; B65F 1/1623; B65F 1/1426; B65F 1/16; B65F 2210/165; B02C 18/0092; B09B 3/00; B09B 2101/70
See application file for complete search history.

(56) References Cited

U.S. PATENT DOCUMENTS

| | | | | |
|---|---|---|---|---|
| 7,913,361 | B2 | 3/2011 | Tomiji | |
| 10,696,477 | B1 * | 6/2020 | Shek | B65F 1/1638 |
| 11,230,434 | B1 * | 1/2022 | Sansone | B65F 1/1638 |
| 11,247,842 | B2 * | 2/2022 | Morad | B65F 1/1638 |
| 2009/0194532 | A1 * | 8/2009 | Yang | B65F 1/1638 220/211 |
| 2011/0220648 | A1 * | 9/2011 | Yang | B65F 1/1638 220/211 |
| 2013/0213965 | A1 * | 8/2013 | Shek | B65F 1/1638 220/211 |
| 2014/0238986 | A1 * | 8/2014 | Crawford | B65F 1/1638 220/211 |
| 2018/0110893 | A1 * | 4/2018 | Chang | A61L 9/20 |
| 2018/0229930 | A1 * | 8/2018 | Shek | B65F 1/1638 |
| 2018/0229931 | A1 * | 8/2018 | Shek | B65F 1/1638 |
| 2018/0352988 | A1 * | 12/2018 | Ortiz | A47G 29/20 |
| 2019/0000255 | A1 * | 1/2019 | Dehner | B65D 43/26 |
| 2019/0152698 | A1 * | 5/2019 | Zhao | B65F 1/1638 |
| 2019/0270586 | A1 * | 9/2019 | Lovingood | B65F 1/1623 |
| 2020/0113365 | A1 * | 4/2020 | Shobe | B65D 43/16 |
| 2020/0115158 | A1 * | 4/2020 | Wang | B65F 1/06 |
| 2020/0268187 | A1 * | 8/2020 | Thomas | A47G 29/20 |
| 2020/0391940 | A1 * | 12/2020 | Wang | B65F 1/02 |
| 2021/0061558 | A1 * | 3/2021 | Shek | B65F 1/1638 |
| 2021/0269238 | A1 * | 9/2021 | Shek | B65F 1/1638 |
| 2021/0362946 | A1 * | 11/2021 | Liao | B65F 1/1638 |
| 2021/0381292 | A1 | 12/2021 | Drzazga | |
| 2022/0258968 | A1 * | 8/2022 | Wang | B65F 1/02 |
| 2022/0267089 | A1 * | 8/2022 | Wang | B65F 1/06 |
| 2022/0329196 | A1 * | 10/2022 | Liao | H10D 84/83 |
| 2023/0084646 | A1 * | 3/2023 | Rogers | F26B 3/04 95/10 |
| 2023/0129640 | A1 * | 4/2023 | Khan | B65F 1/02 241/101.2 |
| 2023/0211352 | A1 * | 7/2023 | Hwang | B02C 18/12 |
| 2024/0009677 | A1 * | 1/2024 | Jin | B02C 25/00 |
| 2024/0059480 | A1 * | 2/2024 | Rykowski | B65B 57/00 |
| 2024/0091785 | A1 * | 3/2024 | Cho | B02C 18/0092 |
| 2024/0116704 | A1 * | 4/2024 | Shin | B65F 1/1638 |
| 2024/0189830 | A1 * | 6/2024 | Hwang | B02C 18/0084 |
| 2024/0390534 | A1 * | 11/2024 | Wang | B65F 1/1646 |
| 2025/0116459 | A1 * | 4/2025 | Lim | B65F 1/14 |
| 2025/0136362 | A1 * | 5/2025 | Marks | B65F 1/0026 |

FOREIGN PATENT DOCUMENTS

| | | | |
|---|---|---|---|
| JP | 4789642 | B2 | 10/2011 |
| JP | 2013-22332 | A | 2/2013 |
| KR | 10-2012-0077617 | A | 7/2012 |
| KR | 10-2012-0119536 | A | 10/2012 |
| KR | 10-2013-0098757 | A | 9/2013 |
| KR | 10-2013-0104900 | A | 9/2013 |
| KR | 10-1502506 | B1 | 3/2015 |
| KR | 10-1639131 | B1 | 7/2016 |
| KR | 10-2018-0005058 | A | 1/2018 |
| KR | 10-1844520 | B1 | 4/2018 |
| KR | 10-1884662 | B1 | 8/2018 |
| KR | 10-2021-0014525 | A | 2/2021 |
| KR | 10-2022-0120409 | A | 8/2022 |
| WO | 2012091520 | A2 | 7/2012 |

* cited by examiner

FOOD WASTE DISPOSER INCLUDING DOOR

CROSS-REFERENCE TO RELATED APPLICATIONS

This application is a bypass continuation application of International Application No. PCT/KR2023/008364, filed on Jun. 16, 2023, in the Korean Intellectual Property Receiving Office, which claims priority from Korean Patent Application No. 10-2022-0127648, filed on Oct. 6, 2022, in the Korean Intellectual Property Office, the disclosures of which are hereby incorporated by reference herein in their entireties.

BACKGROUND

1. Field

Various embodiments relate to a food waste disposer including a door with an opening and closing device capable of operating manually or automatically according to a user's selection.

2. Description of Related Art

A food waste disposer is a device for use in grinding/stirring, heating and/or drying food waste contained therein. A food waste disposer is usually provided with a door to protect a user from heat or gas generated therein while processing the food or physical force caused by a grinding/stirring operation, and performs the above-described various processing with the door being closed. Gas containing water vapor generated while heating food in such a food waste disposer may travel through an exhaust pipe to be deodorized by a filter, and then discharged to the outside. The filters used for deodorization may include an activated carbon filter containing activated carbon therein, an optical filter disposed at the front end of the activated carbon filter to photo-decompose odor elements, and the like.

SUMMARY

Various embodiments of the disclosure provide a food waste disposer including a door capable of being automatically opened based on an electrical signal as well as being manually opened by a physical manual operation of a user even when there is supplied no electric power.

According to an embodiment, a food waste disposer includes a housing having an opening formed on one end thereof, and a door coupled by a hinge to open or close the opening of the housing. The door includes a door lever configured to insert into a fixing groove provided adjacent to the opening of the housing, a holder lever coupled to the door lever and configured to rotate about a rotation shaft, a pulling member configured to transmit a physical external force applied from the outside of the housing to the holder lever such that the holder lever rotates about the rotation shaft, wherein one end of the pulling member is connected to the holder lever, and an actuator configured to generate a force to rotate the holder lever about the rotation shaft, based on an electrical signal.

According to an embodiment, the door may be configured to maintain a closed state of the opening of the housing in a case that the door lever is inserted into the fixing groove and to open the opening of the housing in a case that the door lever is separated from the fixing groove. The door lever may be configured to insert into or separate from the fixing groove based on a rotation of the holder lever.

According to an embodiment, the food waste disposer further includes an elastic body configured to provide an elastic force to the door lever in a direction toward the fixing groove.

According to an embodiment, in a case that the holder lever rotates in the first direction, the elastic body may be configured to contract in a direction away from the fixing groove.

According to an embodiment, in the holder lever, a first portion to which the one end of the pulling member is connected may be arranged to be spaced apart from a second portion to which the force generated by the actuator is applied with a rotation shaft interposed therebetween.

According to an embodiment, the pulling member may be provided such that a portion thereof protrudes to the outside of the door.

According to an embodiment, the portion of the pulling member may protrude outward through an opening provided in the door.

According to an embodiment, the pulling member may extend toward an outside of the door. The door may include a removable rear cover configured to cover such that a free end positioned opposite to the one end of the pulling member is not exposed to the outside, in the outside of the one side of the door.

According to an embodiment, the food waste disposer further includes a controller configured to control an operation of the actuator to generate the force applied to the holder lever in order to rotate the holder lever when an input signal for opening the door is received from the outside.

According to an embodiment, the food waste disposer further includes a temperature sensor may be configured to sense a temperature of at least a partial area of the housing. The controller may be configured to control the operation of the actuator so as not to generate the force applied to the holder lever to rotate the holder lever even when the input signal for opening the door is received from the outside, in the case that the temperature measured by the temperature sensor is greater than or equal to a predetermined temperature.

According to an embodiment, a food waste disposer includes a housing having an opening formed on one side thereof, and a door coupled by a hinge to open or close the opening of the housing. The door includes a door lever configured to insert into a fixing groove provided adjacent to the opening of the housing, a holder lever coupled to the door lever and configured to rotate about a rotation shaft, a pulling member configured to transmit a physical external force applied from the outside of the housing to the holder lever such that the holder lever rotates about the rotation shaft, wherein one end of the pulling member is connected to the holder lever, a pressing portion configured to move in a straight line, and an actuator configured to generate a force applied through the pressing portion to rotate the holder lever about the rotation shaft based on an electrical signal. The pressing portion may be attached or coupled to the holder lever or integrally formed with the holder lever.

According to an embodiment, the actuator may be configured to generate a fixing force to the holder lever through the pressing portion so as to prevent the holder lever from rotating about the rotation shaft.

According to an embodiment, the food waste disposer further includes a temperature sensor configured to sense a temperature in at least a partial area of the housing. The actuator may be configured to generate the fixing force while the temperature measured by the temperature sensor is greater than or equal to a predetermined temperature.

According to an embodiment, the actuator may be configured to generate the force to the holder lever through the pressing portion in order to rotate the holder lever, on a condition that an input signal for opening the door is received from the outside.

According to an embodiment, the food waste disposer further includes a temperature sensor may be configured to sense a temperature in at least a partial area of the housing. The actuator may be configured to generate the force applied through the pressing portion in order to rotate the holder lever, on condition that an input signal for opening the door is received from the outside and the temperature measured by the temperature sensor is less than a predetermined temperature.

According to an embodiment, A food waste disposer includes a housing having an opening formed on one side thereof, and a door coupled by a hinge to open or close the opening of the housing. The door includes a door lever configured to insert into a fixing groove provided adjacent to the opening of the housing, a holder lever coupled to the door lever and configured to rotate about a rotation shaft, a pulling member configured to transmit a physical external force applied from the outside of the housing to the holder lever such that the holder lever rotates about the rotation shaft, wherein one end of the pulling member is connected to the holder lever, a pressing portion configured to move in a straight line, and an actuator configured to generate a force applied through the pressing portion to rotate the holder lever about the rotation shaft based on an electrical signal. The pressing portion may be attached or coupled to the holder lever or integrally formed with the holder lever.

According to an embodiment, the actuator may be configured to generate a fixing force to the holder lever through the pressing portion so as to prevent the holder lever from rotating about the rotation shaft.

According to an embodiment, the food waste disposer further includes a temperature sensor configured to sense a temperature in at least a partial area of the housing. The actuator is further configured to generate the fixing force while the temperature measured by the temperature sensor is greater than or equal to a predetermined temperature.

According to an embodiment, the actuator is further configured to generate the force to the holder lever through the pressing portion in order to rotate the holder lever, on a condition that an input signal for opening the door is received from the outside.

According to an embodiment, The actuator is further configured to generate the force applied through the pressing portion in order to rotate the holder lever on a condition that an input signal for opening the door is received from the outside and the temperature measured by the temperature sensor is less than a predetermined temperature.

According to various embodiments of the disclosure, even when the door is not automatically opened with no electric power being applied to the food waste disposer or due to its malfunction, the door can be manually opened using the pulling member to access the inside of the food waste disposer.

The effects that can be obtained from the disclosure are not limited to those described above, and any other effects not mentioned herein will be clearly derived and understood by those having ordinary knowledge in the technical field to which the disclosure belongs from the description below. In other words, any unintended effects accruing from implementing example embodiments of the disclosure may also be derived from the example embodiments of the disclosure by those having ordinary knowledge in the technical field.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
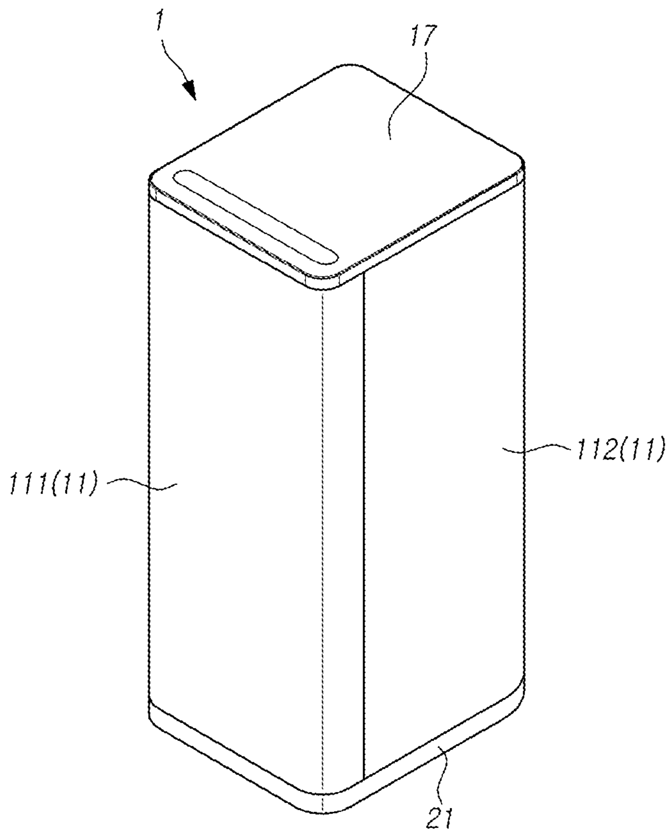
FIG. 1 is a perspective view of a food waste disposer according to certain embodiments of this disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the disclosure are used only to describe specific embodiments and are not intended to limit the technical features of the disclosure thereto. For example, an element expressed in a singular form should be understood as a concept including a singular element plural elements, unless the context explicitly dictates only such a singular form.

As used herein, each of the phrases such as "A or B", "at least one of A and B", "at least one of A or B", "A, B or C", "at least one of A, B and C", and "at least one of A, B, or C" may include any one of the items enumerated together in a corresponding one of the phrases, or all possible combinations thereof. Further, it should be appreciated that the term 'and/or' used herein encompasses any and all possible combinations of one or more of the listed items. The terms such as "the first", "the second", or "first", or "second" may be used simply to distinguish a corresponding component from another component, and do not limit the corresponding components in view of other aspect (e.g., importance or order).

It is to be understood that when an element (e.g., a first element) is referred to, with or without the term "operatively" or "communicatively", as "— coupled", "— connected", "—supported", "— contacted" or "— in contact" to/with another element (e.g., a second element), it includes not only when the element is directly coupled, connected, supported, or in contact with the other element, but also when the element is indirectly coupled, connected, supported, or in contact with the other element through a third element.

The terms such as "comprise", "include" "have", and "consist of" used herein are only intended to designate that there are features, numbers, steps, operations, components, parts, or a combination thereof described in the disclosure, and are not intended to exclude in advance a possibility of the presence or addition of one or more other features, numbers, steps, operations, components, parts, or a combination thereof, by using these terms. When a component is referred to as being located "on" another component, it includes not only the case where the component is contact with the other element, but also the case where another component exists between the two elements.

As used in the disclosure, the expression "configured to ~" may be used interchangeably with, depending on the context, for example, "suitable for~", "having the ability to ~", "designed to ~", "modified to ~", "made to ~", "capable of ~" or the like. The term "configured to ~" may not necessarily mean only "specially designed to ~" in hardware. Instead, in some situations, the expression "a device configured to ~" may mean that the device is "capable of ~" together with another device or component. For example, a phrase "a device configured (or adapted) to perform A, B, and C" may represent a dedicated device for performing a corresponding operation or imply a general-purpose device capable of performing various operations including the corresponding operation.

Meanwhile, the terms such as e.g., "upper", "lower", and "forward/backward direction" used in the disclosure are defined on the basis of the accompanying drawings, and the shapes and positions of the corresponding component are not limited by these terms.

Figure 2:
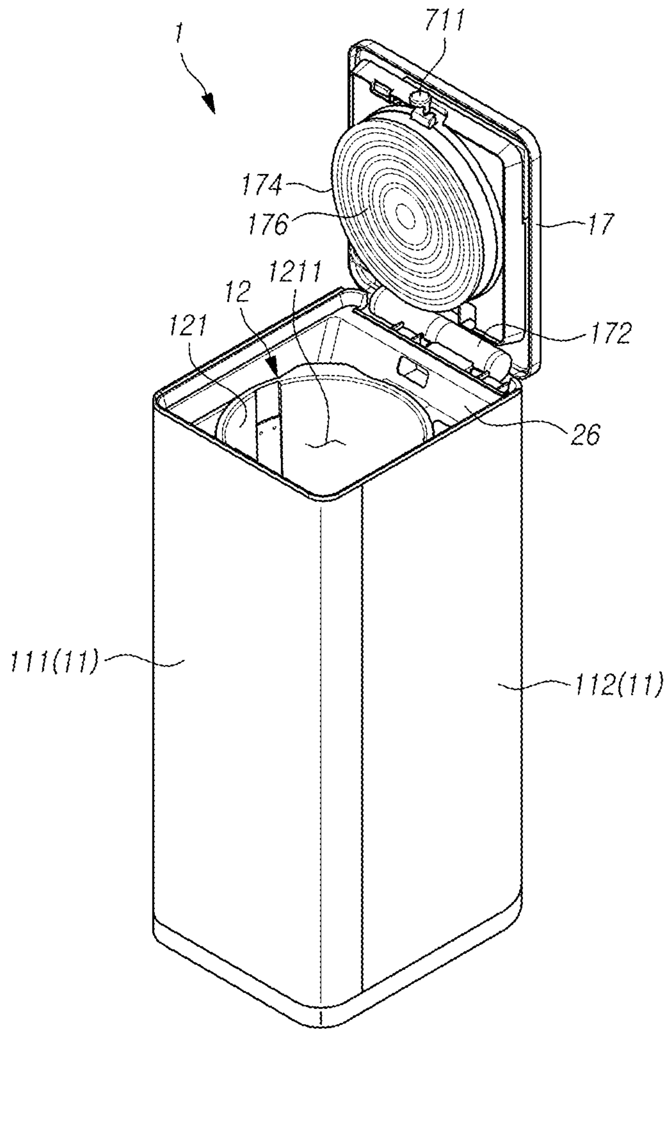
FIG. 2 is a perspective view illustrating a state in which a door of a food waste disposer of FIG. 1 is opened.

FIG. 1 is a perspective view of a food waste disposer according to an embodiment. FIG. 2 is a perspective view illustrating a state in which a door of the food waste disposer of FIG. 1 is opened. And FIG. 3 is a rear perspective view of the food waste disposer of FIG. 1.

Figure 3:
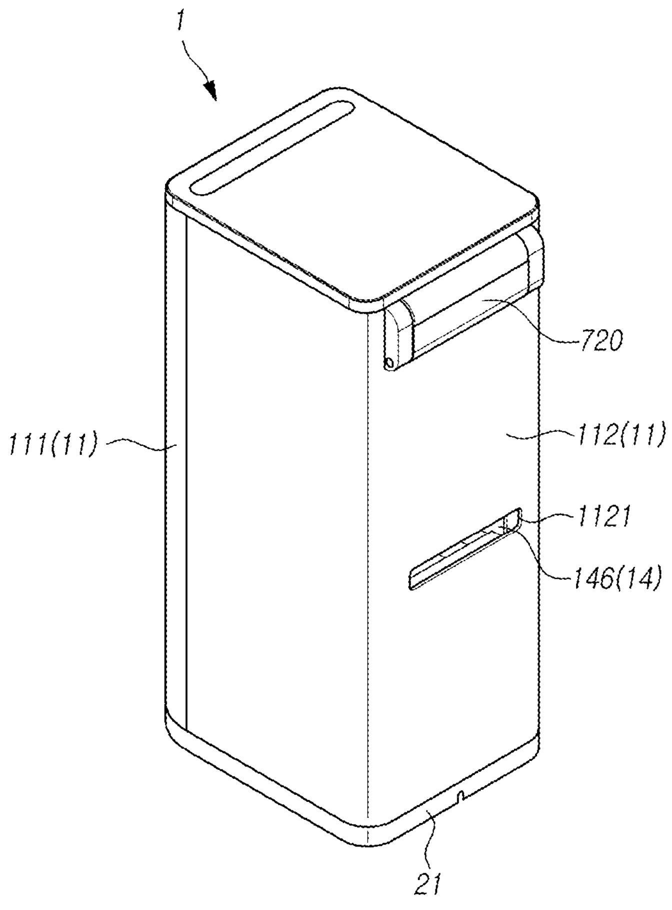
FIG. 3 is a rear perspective view of a food waste disposer of FIG. 1.

Referring to FIGS. 1, 2 and 3, the food waste disposer 1 according to an embodiment may include a housing 11, a disposal unit 12, and a door 17. The food waste disposer 1 may also include a lower frame 21 and an upper frame 26.

According to an example, the housing 11 may include a front housing 111 and a rear housing 112. The housing 11 may form at least part of the exterior of the food waste disposer 1. For example, the housing 11 may form a side exterior of the food waste disposer 1. The lower frame 21 may form a bottom surface of the food waste disposer 1. The housing 11 may be disposed, for example, on the lower frame 21.

The front housing 111 may form a front exterior of the food waste disposer 1. The rear housing 112 may form a rear exterior of the food waste disposer 1. The front housing 111 may be provided to be detachable from the rear housing 112. A user may access various components arranged inside the food waste disposer 1 by separating the front housing 111 and the rear housing 112.

According to an example, the rear housing 112 may include an exhaust hole 1121. The exhaust hole 1121 may be provided to communicate with, for example, an outlet 146 of a deodorization device (e.g., a deodorization device 14 of FIG. 4). The deodorization device (e.g., the deodorization device 14 of FIG. 4) may be a device for filtering air including a bad smell generated by the disposal unit 12, as will be described later. The air filtered by the deodorization device (e.g., the deodorization device 14 of FIG. 4) may be discharged to the outside through the exhaust hole 1121.

According to an example, the disposal unit 12 may include a receiving unit 121 for receiving food waste. The door 17 may be disposed above the disposal unit 12 to open and close the disposal unit 12. The user may open the door 17 to put the food waste for disposal into the receiving unit 121 of the disposal unit 12, and then close the door 17. The food waste received in the receiving unit 121 may be crushed and stirred by a stirrer (e.g., a stirrer 122 of FIG. 4) to be described later. Details of the disposal unit 12 will be described later with reference to FIGS. 4, 5 and 6.

According to an example, the door 17 may include a hinge 172, a disposal unit cover 174, a convection fan (e.g., a convection fan 175 of FIG. 4), and a grill 176. According to an example, the door 17 may further include an opening and closing device (e.g., an opening and closing device 710 of FIG. 8). According to an example, the opening and closing device 710 may enable automatic and manual opening of the door 17 according to a user's selection. The door lever 711 is the only part of the opening and closing device 710 exposed to the outside of the door 17, and other components disposed in the remaining internal spaces are not specifically shown in FIG. 2. The door lever 711 may be inserted into a fixing groove (e.g., a fixing groove 113 of FIG. 4) formed in the upper frame 26 to maintain a closed state of the door 17. A detailed description of the inside of the door 17 and the detailed structure and operation of the opening and closing device 710 will be made later with reference to the remaining drawings.

According to an example, the upper frame 26 may be provided to form an upper surface of the food waste disposer 1 when the door 17 is in an open state. The door 17 may be rotatably arranged with respect to the housing 11 through the hinge 172 connected to the upper frame 26. The disposal unit cover 174 may be provided to open and close the receiving unit 121, and the air in the receiving unit 121 may undergo convection through rotation of the convection fan 175 in a state in which the receiving unit 121 is closed.

Figure 4:
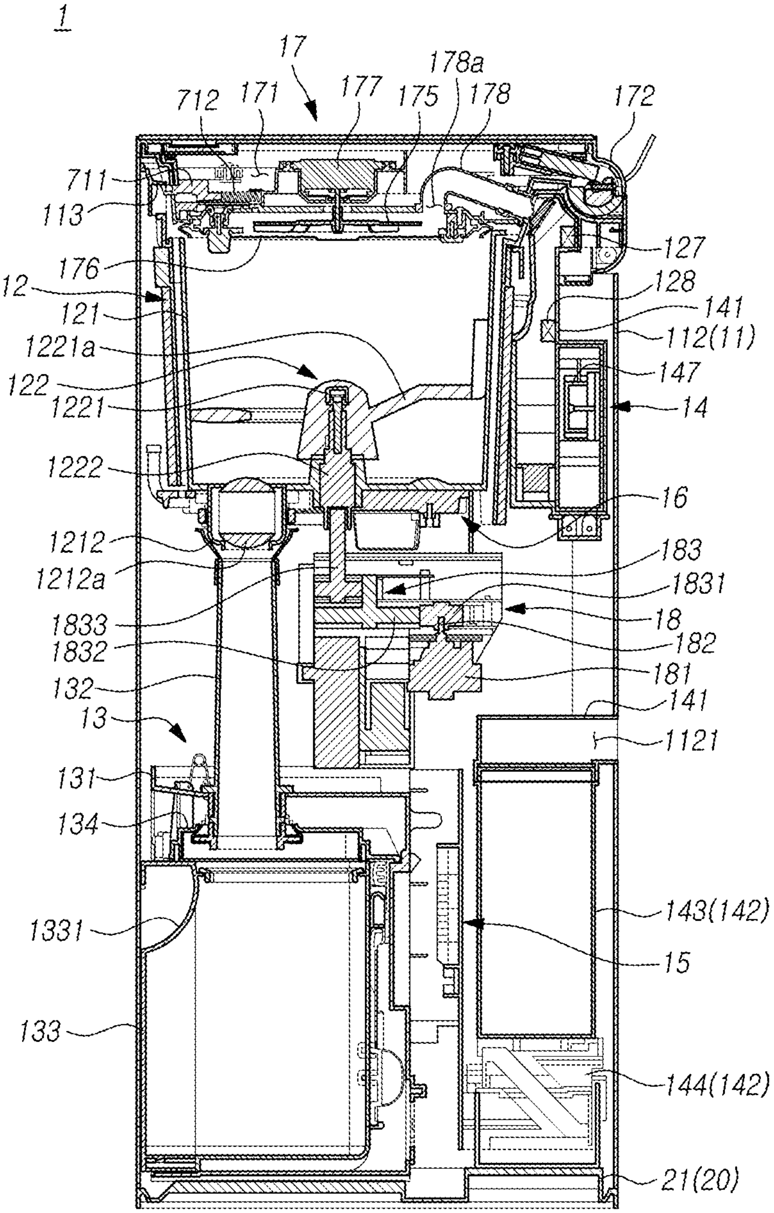
FIG. 4 is a cross-sectional view of a food waste disposer of FIG. 1.
Figure 5:
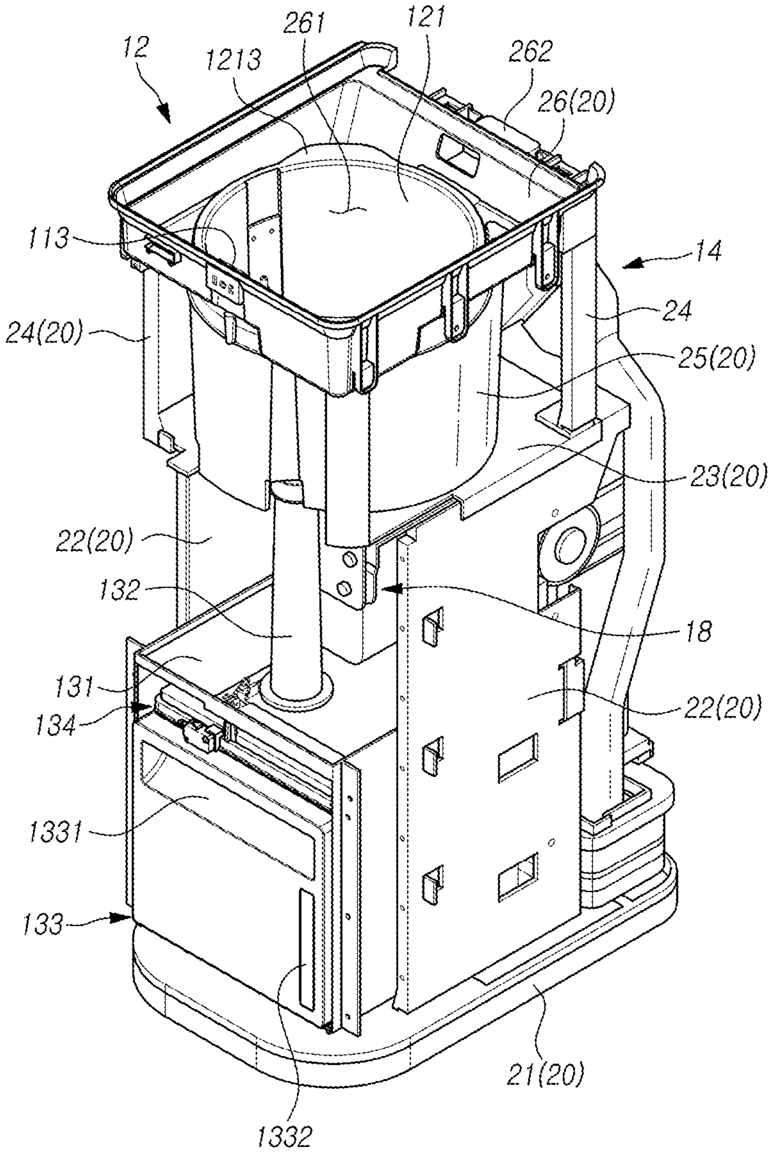
FIG. 5 is a perspective view illustrating a state in which a housing and a door are removed from a food waste disposer according to certain embodiments of this disclosure.

FIG. 4 is a cross-sectional view of the food waste disposer of FIG. 1. FIG. 5 is a perspective view illustrating a state in which a housing and a door are removed from a food waste disposer according to an embodiment. And FIG. 6 is an exploded perspective view of the food waste disposer of FIG. 5.

Figure 6:
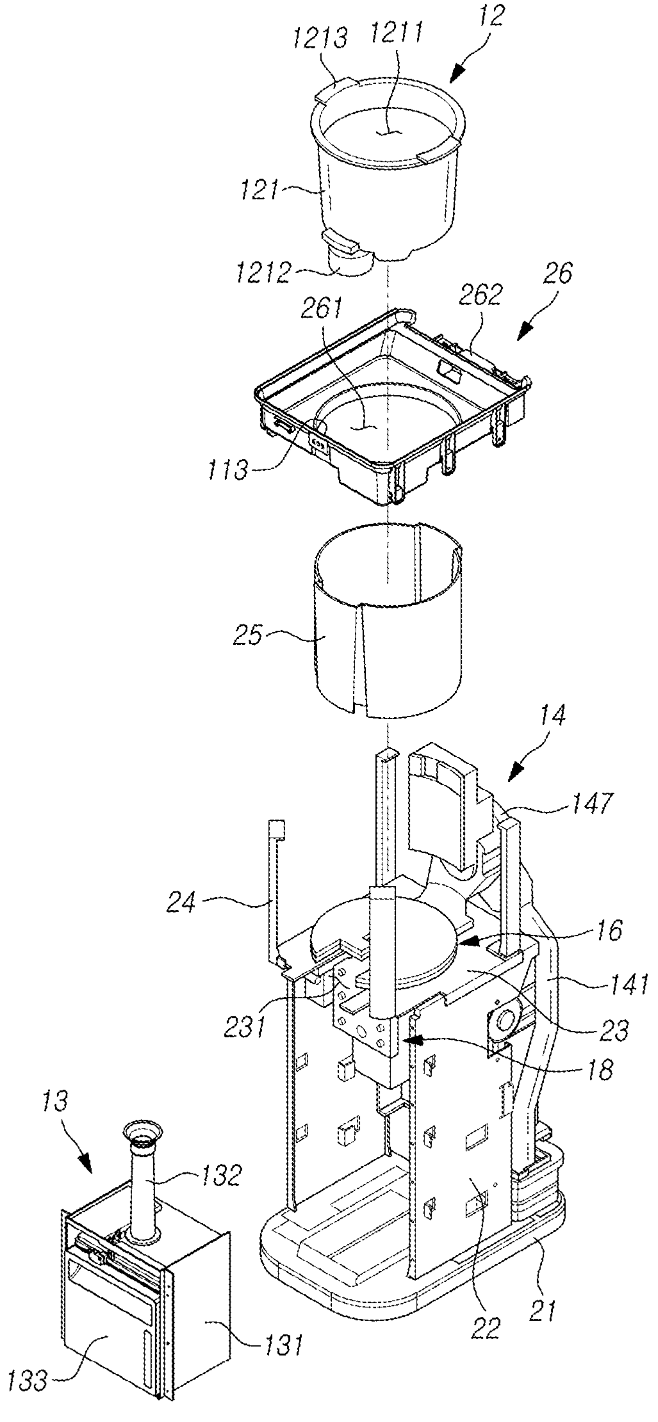
FIG. 6 is an exploded perspective view of a food waste disposer of FIG. 5.

Referring to FIGS. 4 to 6, the food waste disposer 1 according to an embodiment of the disclosure may include a housing 11, a disposal unit 12, a collecting unit 13, a deodorization device 14, a heating unit 16, a door 17, and a controller 15. The housing 11, the disposal unit 12, and the door 17 illustrated herein may be entirely or partially the same as the housing 11, the disposal unit 12, and the door 17 illustrated in FIGS. 1 to 3.

According to an example, the housing 11 may provide an accommodation space for disposing the components of the food waste disposer 1 therein. The housing 11 may serve to protect the components arranged in the accommodation space from any external shocks.

According to an example, the disposal unit 12 may include a receiving unit 121, a stirrer 122, a temperature sensor 127, and a humidity sensor 128. The disposal unit 12 may be, for example, a device for receiving food waste and crushing, stirring, and heating the received food waste.

According to an example, the receiving unit 121 may form an open portion 1211 with its upper end being open. The receiving unit 121 may generally have a cylindrical shape as a whole, but it is not limited thereto. The open portion 1211 may be opened and closed by the door 17. The receiving unit 121 may provide a space in which food waste put in through the open portion 1211 may be stirred, heated, and/or dried. Hereinafter, stirring, heating, and/or drying food waste is referred to as "dispose of (or process) food waste."

According to an example, an opening/closing unit 1212 may be provided at a portion of a lower end of the receiving unit 121. The opening/closing unit 1212 may be provided, for example, to discharge by-products generated by disposal of the food waste from the receiving unit 121. The opening/closing unit 1212 may be closed while the food waste is being disposed, and may be opened after the food disposal is completed. The opening/closing operation of the opening/closing unit 1212 may be controlled by the controller 15. The opening/closing unit 1212 may be opened and closed by, for example, a ball valve **1212*a* disposed therein, but the type of the valve is not limited thereto. The opening/closing unit 1212 may be normally closed, for example, when the food waste disposer 1 does not operate. The opening/closing unit 1212 may be closed, for example, during food waste disposal. The opening/closing unit 1212 may be opened, for example, after the food waste disposal operation is finished. The by-products generated by food waste disposal may be transferred to a storage container 133 for storing the by-products through the opening/closing unit 1212. In order to smoothly transfer the by-products to the storage container 133 through the opening/closing unit 1212, the stirrer 122 may be rotated while the opening/closing unit 1212** is opened.

According to an example, a handle 1213 formed to partially protrude radially outward may be provided at an upper end of the receiving unit 121. The user may grip the receiving unit 121 using the handle 1213. The receiving unit 121 may be configured to be lifted upward to be separated from the food waste disposer 1. The user may easily separate the receiving unit 121 from the food waste disposer 1 by using the handle 1213.

According to an example, the stirrer 122 may include a rotation grinder 1221 and a power transmission member 1222. One end of the power transmission member 1222 may be connected to the rotation grinder 1221, and the other end of the power transmission member 1222 may be connected to a driving unit 18. The power transmission member 1222 may form a rotation shaft of the rotation grinder 1221. The rotation grinder 1221 may be connected to, for example, the power transmission member 1222 to rotate about the power transmission member 1222. The power transmission member 1222 may be disposed to, for example, penetrate a portion of the lower surface of the receiving unit 121. For example, the power transmission member 1222 may be arranged such that a portion of the power transmission member 1222 is located inside the receiving unit 121 and another portion of the power transmission member 1222 is located outside the receiving unit 121. In other words, amongst the components connected to the upper end and the lower end of the power transmission member 1222, the rotation grinder 1221 may be located inside the receiving unit 121, and the driving unit 18 may be located outside the receiving unit 121. The stirrer 122 may be provided, for example, inside the receiving unit 121.

According to an example, the rotation grinder 1221 may include a plurality of blades **1221*a*. The plurality of blades 1221*a* may be arranged, for example, to have different heights, respectively. The disposal unit 12 may grind and stir the food waste filled in the receiving unit 121, for example, by rotating the rotating grinder 1221. That is, the stirrer 122** may serve to grind and stir the food waste put in the receiving unit 121 so that the food waste is uniformly heated.

According to an example, the driving unit 18 may include a driving motor 181, a shaft 182, and a gear assembly 183. For example, one end of the shaft 182 may be connected to the driving motor 181 and the other end of the shaft 182 may be connected to the gear assembly 183. Specifically, the other end of the shaft 182 may be connected to a first gear 1831 of the gear assembly 183. The shaft 182 may transmit, for example, a rotational power of the driving motor 181 to the gear assembly 183. The rotational power transmitted to the gear assembly 183 may be transmitted to the power transmission member 1222.

According to an example, the gear assembly 183 may include a first gear 1831, a second gear 1832, and a third gear 1833, but the number of gears constituting the gear assembly 183 is not limited thereto. The first gear 1831 may be, for example, coupled to the shaft 182 and may be disposed to rotate together with driving of the driving motor 181. The second gear 1832 may be, for example, rotatably disposed to be engaged with the first gear 1831. The third gear 1833 may be, for example, rotatably disposed to be engaged with the second gear 1832. The third gear 1833 may be, for example, rotatably coupled to the power transmission member 1222. The power transmission member 1222 may receive, for example, the rotational power directly from the third gear 1833.

According to an example, the temperature sensor 127 or the humidity sensor 128 may be provided to detect temperature or humidity within the receiving unit 121. The temperature sensor 127 or the humidity sensor 128 may transmit, for example, information about the temperature or the humidity to the controller 15. The controller 15 may control overall operations of the devices used to dispose of food waste, such as the stirrer 122, the convection fan 175, a fan driver 177, the driving unit 18, and/or the heating unit 16, by using the received information about temperature or humidity.

According to an example, the heating unit 16 may be provided adjacent to an outer surface of the receiving unit 121. The heating unit 16 may be located, for example, underneath the receiving unit 121, but it is not limited thereto. The heating unit 16 may generate heat, for example, by heating wires provided therein. When the temperature inside the receiving unit 121 is increased by the heating unit 16, moisture in the food waste may be evaporated and dried. The evaporated water vapor may be discharged to the deodorization device 14, so that the odor and the like may be removed by the filter and then discharged to the outside.

The heating unit 16 may be provided, for example, between the receiving unit 121 and a receiving frame 25 arranged to fix the position of the receiving unit 121. Here, the receiving frame 25 may be a frame configured to cover the outside of the disposal unit 12 and the heating unit 16 so that the disposal unit 12 and the heating unit 16 is more stably supported and fixed inside the food waste disposer 1.

According to an example, the door 17 may include a hinge 172, a disposal unit cover (e.g., the disposal unit cover 174 of FIG. 2), and a grill 176. According to an example, the door 17 may include an inner space 171 for disposing components therein. For example, the convection fan 175, the fan driver 177, and a discharge pipe 178 may be arranged within the inner space 171. Similar to those described above with reference to FIGS. 1 to 3, according to an embodiment, an opening and closing device (e.g., the opening and closing device 710 of FIG. 8) may also be disposed in the inner space 171 of the door 17. In FIG. 4 is illustrated a door lever 711 and an elastic body 712 amongst the components of the opening and closing device 710. As illustrated, the door lever 711 may be inserted into the fixing groove 113 formed in front of the upper frame 26, and the elastic body 712 may pressurize and support a back side of the door lever 711 so as to maintain the inserted state of the door lever 711 thereby keeping the door 17 in its closed state. When the elastic body 712 is retracted backward, the door lever 711 may move backward together to exit from the fixing groove 113, in which case the door 17 may be opened. A detailed description of the movement of the door lever 711 and the elastic body 712 will be described later with reference to FIGS. 7 and 8.

According to an example, the disposal unit cover 174 may be provided underneath the door 17 to open and close the open portion 1211 of the upper part of the receiving unit 121. The disposal unit cover 174 may have, for example, a shape corresponding to the shape of an upper surface of the receiving unit 121. In a state of the door 17 being closed, the disposal unit cover 174 may cover the open portion 1211. In the receiving unit 121 covered by the disposal unit cover 174, the air including water vapor therein may flow into the deodorization device 14 through the discharge pipe 178 of the door 17.

According to an example, the hinge 172 may be provided on the rear side of the door 17 in the state of the door 17 being mounted onto the upper portion of the housing 11. For example, the hinge 172 may be provided adjacent to an uppermost end of the rear housing 112. The hinge 172 may be disposed, for example, at a position corresponding to a hinge mounting portion 262 of the upper frame 26 to be described later. The hinge 172 may be mounted, for example, onto the hinge mounting portion 262 of the upper frame 26. As such, the door 17 may be opened and closed by rotation about an axis of the hinge 172. The user may open the door 17 to put food waste into the receiving unit 121.

According to an example, the convection fan 175 may be disposed underneath the disposal unit cover 174. When the convection fan 175 rotates, the flow of air generated by the rotation may be transferred into the receiving unit 121 to form convection of air.

According to an example, the convection fan 175 may be disposed to rotate about a portion of the door 17 adjacent to the center of the disposal unit cover 174. The food waste disposer 1 may cause convection of air in the receiving unit 121, for example, by rotating the convection fan 175. That is to say, when the receiving unit 121 is heated, the food waste disposer 1 may drive the convection fan 175 to circulate the air within the receiving unit 121, thereby making its internal temperature uniform. The convection fan 175 may be rotated by, for example, the fan driver 177 provided in the inner space 171 of the door 17.

According to an example, the grill 176 may be arranged underneath the convection fan 175. The grill 176 may be disposed between the receiving unit 121 and the convection fan 175. The grill 176 may be provided with a plurality of holes, so that the flow of air generated by the rotation of the convection fan 175 may be transferred to the receiving unit 121 through the plurality of holes. The grill 176 may be fixed to the door 17 by means of a screw coupling, for example.

A relatively large by-product may cause contamination of the convection fan 175 and interfere with the rotation of the convection fan 175 due to ascending air current of the convection inside the receiving unit 121 formed by the rotation of the convection fan 175. The food waste disposer 1 may be provided with the grill 176 underneath the convection fan 175 to prevent such contamination and interference.

According to an example, the discharge pipe 178 may be provided such that a discharge port 178*a* is positioned above the convection fan 175. The discharge port 178*a* may be located above the convection fan 175. The discharge pipe 178 may be arranged such that an opposite end of the discharge port 178*a* is connected to an exhaust pipe 141 of the deodorization device 14. That is to say, the discharge pipe 178 is configured to connect the receiving unit 121 and the exhaust pipe 141 of the deodorization device 14, and may be arranged to allow the gas in the receiving unit 121 to flow into the deodorization device 14.

Although not illustrated herein, a locking device (not shown) may be provided in the door 17 or the receiving unit 121. The locking device may be arranged to lock the door 17 so that the user cannot access the inside while disposing of the food waste.

According to an example, a collecting unit 13 may include a storage container 133, a storage container cover 134, a case 131, and a transfer pipe 132. The collecting unit 13 may be a device for receiving from the receiving unit 121 by-products obtained by grinding, stirring, or heating of the food waste in the disposal unit 12 and storing the same therein. The collecting unit 13 may have a sealed structure so that the by-products stored and any odors that may be generated from the by-products do not leak to the outside of the collecting unit 13.

According to an example, the storage container 133 may include a gripper 1331 and a transparent window 1332. The user may attach and detach the storage container 133 to/from the case 131 using the gripper 1331. The transparent window 1332 may be disposed in a place that is visible from the outside when the storage container 133 is attached onto the case 131. The transparent window 1332 may be formed along a direction of the height of the storage container 133 so that the user can visually check the height of the by-product accumulated in the storage container from the outside.

According to an example, the transfer pipe 132 may be configured to connect the receiving unit 121 and the storage container 133. For example, the by-products generated by processing in the receiving unit 121 may be transferred to the storage container 133 along the transfer pipe 132. For example, when the by-product is transferred from the receiving unit 121 to the storage container 133, it may be transferred in a free-fall manner.

According to an example, the case 131 may be disposed to be surrounded by the lower frame 21 and the side frame 22, which will be described later. The case 131 may be configured, for example, such that its one surface (e.g., a surface facing forward of the food waste disposer 1) is opened. The storage container 133 may be mounted in place and detached therefrom through the open portion of the case 131.

According to an example, the storage container cover 134 may be provided to seal the storage container 133 when the storage container 133 is mounted onto the case 131. The storage container cover 134 may be fixedly disposed in an upper part in the inner space of the case 131.

According to an example, the deodorization device 14 may include an exhaust pipe 141, a deodorization unit 142, an outlet (e.g., the outlet 146 of FIG. 3), and a deodorization fan 147. The deodorization device 14 may be a device for filtering the odor and then discharging the same, when the gas containing the odor generated from the food waste accommodated in the receiving unit 121 is discharged to the outside of the food waste disposer 1.

According to an example, the deodorization unit 142 may include an activated carbon filter 143 and an optical filter module 144. The gas passing through the deodorization unit 142 may be photolyzed and filtered by, for example, the optical filter module 144. The gas passing through the deodorization unit 142 may be filtered, for example, passing through the activated carbon filter 143. The gas passing through the deodorization unit 142 may be primarily filtered by the optical filter module 144 and then secondarily filtered by the activated carbon filter 143. Before the gas introduced from the receiving unit 121 to the deodorization unit 142 is filtered by the activated carbon filter 143, the gas may be primarily filtered by the optical filter module 144 so as to extend the service life of the activated carbon filter 143. The gas filtered by the deodorization unit 142 may be discharged to the outlet 146 along the exhaust pipe 141. The outlet 146 may be connected to the exhaust hole 1121 of the rear housing 112, and the filtered gas may be discharged through the exhaust hole 1121.

According to an example, a photocatalytic filter may be provided in the optical filter module 144. The photocatalytic filter may be made of, for example, titanium dioxide. For example, when light energy in the ultraviolet region is applied to the photocatalytic filter, a strong reducing power of hydrogen peroxide and a strong oxidizing power of hydroxyl group are generated on its surface, thereby decomposing various contaminants and pernicious ingredients in the gas.

For the activated carbon filter 143, for example, activated carbon having a size of 1 mm to 10 mm may be used. The activated carbon may deodorize, for example, the odor of the gas passing through the optical filter module 144.

According to an example, the deodorization fan 147 may be provided in the exhaust pipe 141. The deodorization fan 147 may be provided, for example, on a flow path in the deodorization device 14 for flowing of the gas passing through the inside of the deodorization device 14.

According to an example, the controller 15 may control the overall operation of the electronic components of the food waste disposer 1. For example, the controller 15 may perform an overall control necessary for a disposing process of food waste thrown into the receiving unit 121. According to an example, the controller 15 may obtain a signal requesting to open the door 17 from the user, and may control the operation of the opening and closing device 710 such that the door 17 is opened accordingly.

For example, the controller 15 may perform a control to rotate the stirrer 122 by operating the driving unit 18 to crush and stir the food waste. For example, the controller 15 may perform a control to heat the heating wires in the heating unit 16 to heat an interior of the receiving unit 121. For example, the controller 15 may control the operation of the convection fan 175 to cause convection of the gas in the receiving unit 121. For example, the controller 15 may perform control to open the opening/closing unit 1212 to transfer the remaining by-products to the storage container 133 after finishing disposing of the food waste.

The controller 15 may adjust the heat generation intensity of the heating unit 16 and the rotation strength of the convection fan 175, for example, by using the information about temperature or humidity in the receiving unit 121 transferred from the temperature sensor 127 or the humidity sensor 128, thereby improving the operation efficiency of the food waste disposer 1.

The food waste disposer 1 may include a plurality of frames 20 for supporting and fixing components within the housing 11. According to various embodiments, the plurality of frames 20 may include a lower frame 21, a side frame 22, an intermediate frame 23, a support frame 24, a receiving frame 25, and an upper frame 26.

According to an example, the lower frame 21 may form a bottom surface of the food waste disposer 1. The lower frame 21 may support, for example, the front housing 111 and the rear housing 112. The lower frame 21 may support, for example, the collecting unit 13. The lower frame 21 may support, for example, a lower end of the side frame 22. Specifically, the lower end of the side frame 22 may be positioned at both the opposing ends of the upper surface of the lower frame 21.

According to an example, the side frame 22 may configure at least part of the side surface of the food waste disposer 1. For example, the side frame 22 may be formed of a pair of side frames each of which is on either side surface of the food waste disposer 1. The side frame 22 may be, for example, disposed to be perpendicular to the lower frame 21. The side frame 22 may be, for example, provided to surround both sides of the collecting unit 13. That is, at least part of the collecting unit 13 may be disposed to be surrounded by the housing 112 and the side frame 22.

According to an example, the intermediate frame 23 may be coupled to an upper end of the side frame 22. That is, the intermediate frame 23 may be supported by the side frame 22. The intermediate frame 23 may be provided, for example, to distinguish between the disposal unit 12 and the collecting unit 13 in the food waste disposer 1 or to assist the support of an intermediate portion of the food waste disposer 1 to make its structure more stably. The intermediate frame 23 may be disposed, for example, to be parallel to the lower frame 21. The heating unit 16 and the disposal unit 12 may be arranged above the intermediate frame 23.

According to an example, the intermediate frame 23 may include a cut portion 231, which is a portion cut out of the intermediate frame. The cut portion 231 may be formed, for example, in the front. The cut portion 231 may be, for example, a space through which a transfer pipe 132 for transferring the by-products from the disposal unit 12 to the collecting unit 13 passes.

According to an example, a space in which the collecting unit 13 is accommodated may be defined by the lower frame 21, the side frame 22, and the intermediate frame 23.

According to an example, the support frame 24 may be provided to support the surroundings of the disposal unit 12 of the food waste disposer 1. For example, a plurality of support frames 24 may be arranged at corner portions of the intermediate frame 23, respectively. The number of support frames 24 may be, for example, four, but the present disclosure is not limited thereto. The disposal unit 12 may be disposed inside a plurality of support frames 24.

According to an example, the receiving frame 25 may be provided to accommodate the disposal unit 12. The receiving frame 25 may be disposed, for example, between the upper frame 26 and the intermediate frame 23. The receiving frame 25 may be disposed, for example, inside a plurality of support frames 24. The receiving frame 25 may be provided, for example, in a substantially cylindrical shape with open uppermost and lowermost portions.

According to an example, the upper frame 26 may be provided to form an upper surface of the food waste disposer 1 when the door 17 is opened. According to an example, the upper frame 26 may include an opening 261 and a hinge mounting portion 262.

According to an example, the opening 261 may be formed in front of the upper frame 26. The opening 261 may be provided, for example, such that the receiving unit 121 passes through the opening 261. Accordingly, a portion of the receiving unit 121 may be disposed to protrude upward from the upper frame 26. The user may put food waste through the open portion 1211 of the receiving unit 121 protruding upward from the upper frame 26. The shape and size of the opening 261 may correspond to the cross-sectional shape or size of the receiving unit 121. The opening 261 may be, for example, circular, but the disclosure is not limited thereto.

According to an example, the hinge mounting portion 262 may be formed behind the upper frame 26. The hinge 172 of the door 17 may be mounted onto the hinge mounting portion 262. Accordingly, the door 17 may rotate about the hinge 172 with respect to the upper frame 26.

Figure 7:
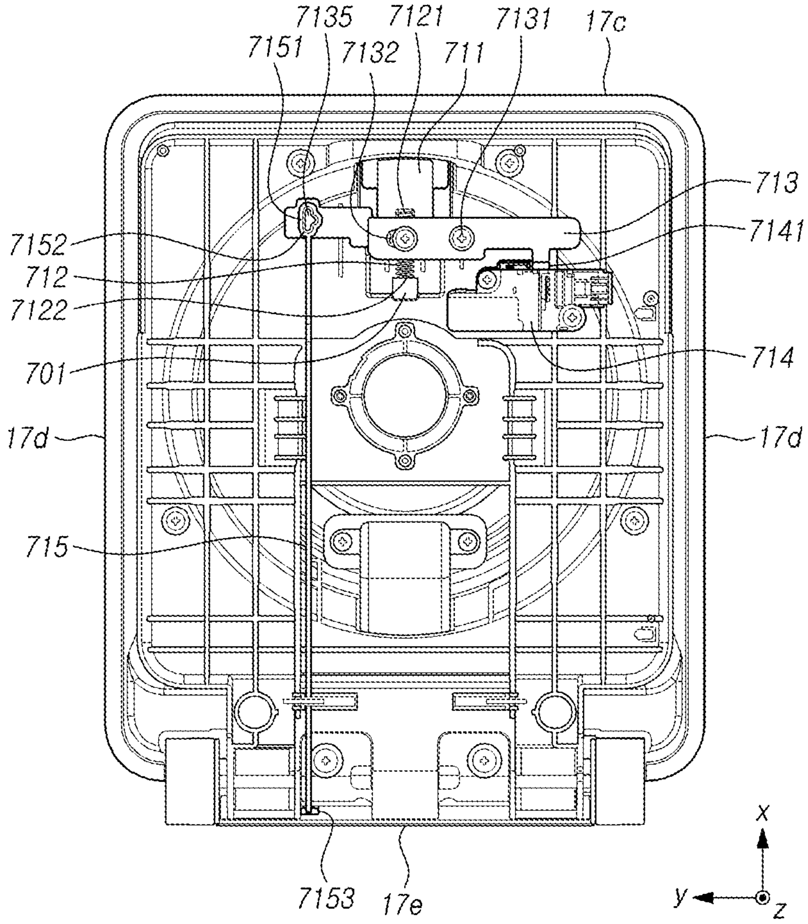
FIG. 7 is a plan view illustrating part of an internal configuration of a food waste disposer door according to certain embodiments of this disclosure.
Figure 8:
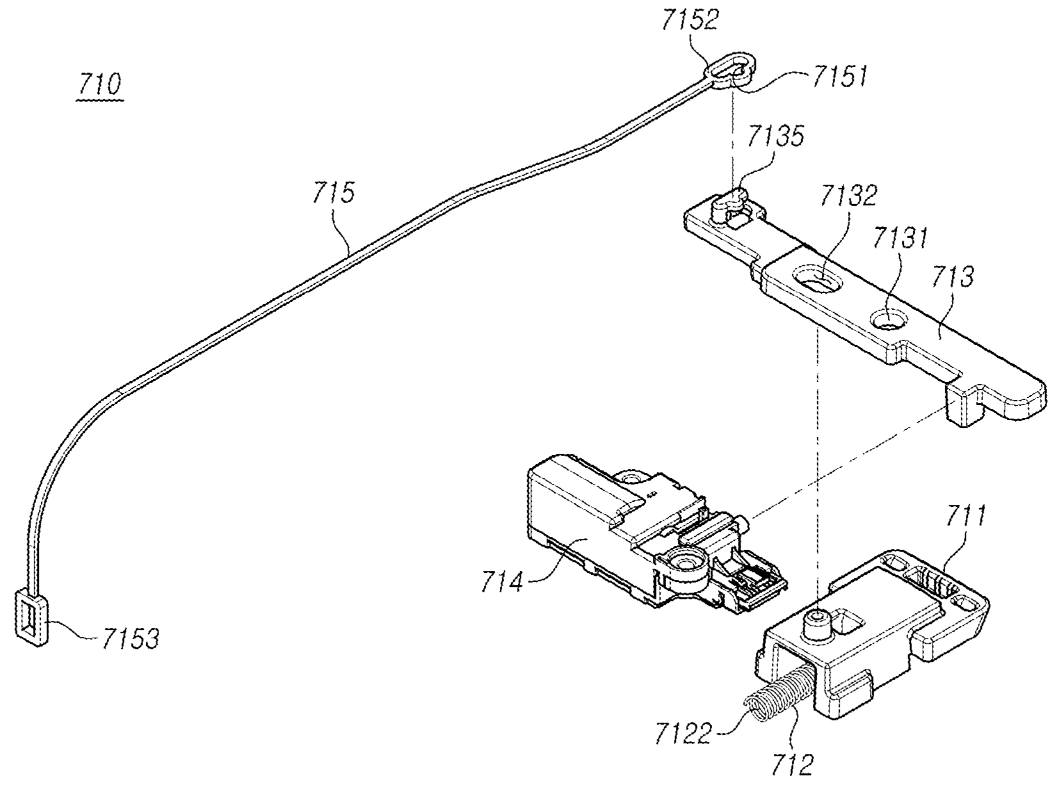
FIG. 8 is an exploded view of an opening and closing device involved in door opening/closing in the internal configuration of the door of a food waste disposer shown in FIG. 7, according to certain embodiments of the disclosure.

FIG. 7 is a plan view illustrating part of an internal configuration of a door of a food waste disposer according to an embodiment. And FIG. 8 is an exploded perspective view illustrating an opening and closing device involved in opening/closing of the door 17 of internal components of the door shown in FIG. 7, according to an embodiment.

According to an example, the door 17 illustrated in FIG. 7 may be substantially the same as the door 17 illustrated in FIGS. 1 to 6. For example, the door 17 illustrated in FIG. 7 may be coupled by hinge to the food waste disposer 1 of FIGS. 1 to 6. In FIG. 7 is illustrated a state in which the upper cover (not shown) of the door 17 is removed and then viewed from above, in order to describe the internal configuration of the door 17, in particular, the opening and closing device 710 located inside the door 17. Hereinafter, the description overlapping that of the door 17 described with reference to FIGS. 1 to 6 will be omitted for the conciseness of description.

According to an example, the door 17 may include a front surface 17*c* located in the front direction toward +x-axis direction, both side surfaces 17*d* extending in a direction perpendicular to the front surface 17*c*, and a rear surface 17*e* located opposite to the front surface 17*c*. The front surface 17*c* and the side surfaces 17*d* may make up a substantially vertical direction. The side surface 17*d* and the rear surface 17*e* may form a substantially vertical direction.

The door 17 may be provided to open and close an opening formed in the housing (e.g., the housing 11 of FIG. 2), for example. According to an example, the door 17 may include an opening and closing device 710. The opening and closing device 710 may be configured to enable the door 17 either to be electrically automatically opened in response to a signal input from the outside, or to be manually opened by applying a physical external force directly by the user.

According to an example, the opening and closing device 710 may include a door lever 711, an elastic body 712, a holder lever 713, an actuator 714, and a pulling member 715. The opening and closing device 710 may be configured to either automatically or manually open the door 17 in its closed state according to a user's selection. For example, the door 17 may maintain the closed state by causing the door lever 711 to be inserted and locked into a fixing groove (e.g., the fixing groove 113 of FIG. 4) of an upper frame (e.g., the upper frame 26 of FIG. 4). The door 17 may be opened, for example, by the door lever 711 moving backward (e.g., moving in −x-axis direction) and being separated from the fixing groove 113. For example, the door lever 711 may be moved backward by the actuator 714 driven using an electrical signal. Alternatively, for example, the door lever 711 may be moved backward by pulling the pulling member 715 by a physical external force.

According to an example, a portion of the door lever 711 may be configured to protrude from one surface of the door 17 to be movable forward and backward in a linear direction. The door 17 may be inserted and locked into the door lever 711 into the fixing groove (e.g., the fixing groove 113 of FIG. 4) of the food waste disposer 1, thereby maintaining its closed state. When the door lever 711 moves backward, the locking with the fixing groove 113 may be released and then the door 17 may be opened. According to an example, the door lever 711 may be located in a position corresponding to the fixing groove 113.

According to an example, the elastic body 712 may be coupled to the door lever 711. One end 7121 of the elastic body 712 may be detachably coupled to the door lever 711. The other end 7122 of the elastic body 712 may be fixed by a support portion 701. The support portion 701 may be, for example, a wall formed in an inner frame of the door 17. The inner frame of the door 17 may be, for example, a frame formed to define the arrangement of each component inside the door 17. The elastic body 712 may be compressed by the backward movement of the door lever 711, in the state of the other end 7122 being fixed to the support portion 701. When the elastic body 712 is compressed, an elastic force may be generated in the forward direction (e.g., +x-axis direction) of the door lever 711. For example, the elastic body 712 may provide the elastic force to the door lever 711 in a direction toward the fixing groove 113. The elastic body (712) may be, for example, a spring.

According to an example, the holder lever 713 may have a rotation shaft 7131 fixed to a frame inside the door 17. The holder lever 713 may be configured to be rotatable about the rotation shaft 7131. When an external force is applied, the holder lever 713 may rotate about the rotation shaft 7131.

According to an example, the holder lever 713 may be coupled to the door lever 711. A portion of the holder lever 713 may vertically overlap and be coupled to a portion of the door lever 711. For example, the holder lever 713 may be coupled to overlap the portion of the door lever 711 when viewed in z-axis direction. A through hole 7132 may be formed in the portion of the holder lever 713 overlapping the door lever 711. The door lever 711 and the holder lever 713 may be coupled, for example, by a screw passing through the through hole 7132.

For example, when the rotation direction of the holder lever 713 rotated by pressurizing of the actuator 714 is a counterclockwise direction when the door 17 is viewed from the top to the bottom in z-axis direction, the door lever 711 may be coupled to the holder lever 713 to be located in +y-axis direction of the rotation shaft 7131, as illustrated. For example, when the rotation direction of the holder lever 713 rotated by pressurizing of the actuator 714 is a clockwise direction when the door 17 is viewed from the top to the bottom in z-axis direction, the door lever 711 may be coupled to the holder lever 713 to be located in −y-axis direction of the rotation shaft 7131.

The holder lever 713 and the door lever 711 may operate to be dependent on each other. When the holder lever 713 rotates in the first rotation direction, the door lever 711 may move backward. The holder lever 713 may rotate in the first rotation direction, for instance, when the pulling member 715 is pulled or the actuator 714 presses the holder lever 713. Here, the first rotation direction may be a counterclockwise direction with respect to FIG. 7 (or when the door 17 is viewed from above to below in z-axis direction) or a direction in which the door lever 711 is rotated to move backward. When the holder lever 713 rotates in a second rotation direction opposite to the first rotation direction, the door lever 711 may move forward. The holder lever 713 may rotate in the second rotation direction, for example, when the door lever 711 having moved backward moves forward by means of the elastic force of the elastic body 712.

According to an example, the actuator 714 may be configured to rotate the holder lever 713 by pressing a portion of the holder lever 713. Although not specifically shown herein, the food waste disposer 1 may include a predetermined input unit configured to obtain a command from a user. According to an example, a command to open the door received through the input unit in the food waste disposer 1 may be transmitted to the actuator 714 in the form of an electrical signal. The actuator 714 may rotate, for example, the holder lever 713 in the first rotation direction based on the received electrical signal. When the holder lever 713 rotates in the first rotation direction, the door lever 711 may move backward to open the door 17.

According to an example, the actuator 714 may include a pressing portion 7141 configured to linearly move based on an electrical signal. The pressing portion 7141 may have, for example, a rod shape. The pressing portion 7141 may be configured to move forward in x-axis direction or move backward in −x-axis direction. The pressing portion 7141 may move forward toward the holder lever 713 to press a portion of the holder lever 713, thereby rotating the holder lever 713 about the rotation shaft 7131.

According to an example, the pulling member 715 may be configured to be connected to the holder lever 713. For example, the pulling member 715 may be connected to one end of the holder lever 713 and positioned to apply a force thereto. For example, the actuator 714 may be positioned to apply a force to the other end of the holder lever 713. For example, the actuator 714 may be disposed to press the other end of the holder lever 713 through the pressing portion 7141. The rotation direction of the holder lever 713 rotated by applying an external pulling force to the pulling member 715 may be the same as the rotation direction of the holder lever 713 rotated by pressing of the actuator 714. The positions of the pulling member 715 and the actuator 714 are not limited to those described above. In the holder lever 713, for example, a portion to which the pulling member 715 is connected and another portion pressed by the actuator 714 may be spaced apart from each other with the rotating shaft 7131 therebetween. In the holder lever 713, for example, the portion to which the pulling member 715 is connected and the other portion pressed by the actuator 714 may be positioned to be spaced apart from each other on one side of the rotating shaft 7131, without the rotating shaft 7131 interposed therebetween.

When an external force (e.g., a pulling force in −x-axis direction) is applied through the pulling member 715 connected to the holder lever 713, the holder lever 713 may be rotated. For example, when the user pulls the pulling member 715 in −x-axis direction, the pulling force may be transmitted to the holder lever 713 so that the holder lever 713 may rotate in a specific direction (e.g., the first rotation direction). When the holder lever 713 rotates in the first rotation direction, the door lever 711 may move backward to open the door 17. The pulling member 715 may be, for example, a wire or a rod, but the disclosure is not limited thereto.

According to an example, the pulling member 715 may include a hook 7151. The hook 7151 may be a portion formed at one end 7152 of the pulling member 715 and coupled to the holder lever 713. In order for the hook 7151 to be coupled to the holder lever 713, a coupling protrusion 7135 may be formed at a coupled portion of the holder lever 713. The hook 7151 of the pulling member 715 may be fixed to the coupling protrusion 7135 of the holder lever 713, so that the external force applied to the pulling member 715 may be transferred to the holder lever 713.

According to an example, one end 7152 of the pulling member 715 may be connected to the holder lever 713, and the other end 7153 thereof (or a free end) positioned opposite to the one end 7152 may be disposed to face the rear side (e.g., −x-axis direction) of the door 17, but the arranged direction of the pulling member 715 is not limited thereto. For example, the other end 7153 of the pulling member 715 may be disposed not only toward the rear (e.g., −x-axis direction) of the door 17, but also toward the front (e.g., +x-axis direction) facing the rear or the side (e.g., either +y-axis direction or −y-axis direction). For example, the other end 7153 of the pulling member 715 may be disposed at a position facing any one of the front surface 17*c*, the side surface 17*d*, or the rear surface 17*e* of the door 17. In the closed state of the door 17, the user may physically pull the other end 7153 of the pulling member 715 to rotate the holder lever 713 positioned inside the door 17 to open the door 17. In an example, even when electric power is not applied to the food waste disposer 1 due to power outage, malfunction, or any other reason, the holder lever 713 connected to the pull member 715 may be rotated by applying of a physical external force from the user using the pull member 715, and thus, the door 17 can be opened.

Figure 9:
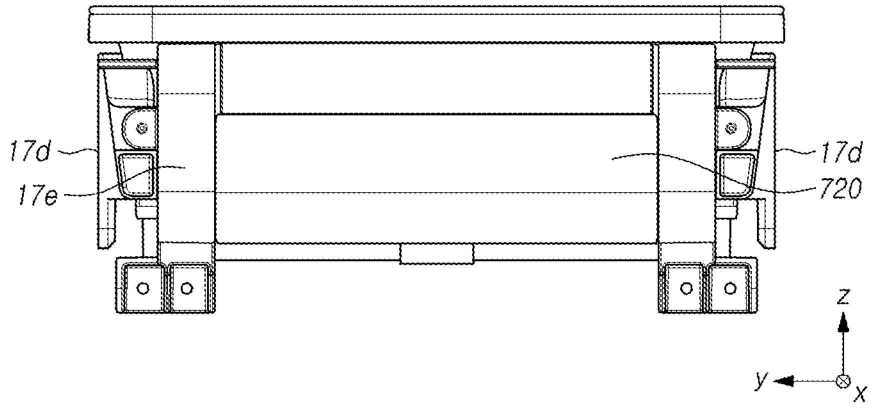
FIG. 9 is a view illustrating a food waste disposer door shown in FIG. 7 viewed from the rear, according to certain embodiments of this disclosure.

FIG. 9 is a schematic view illustrating a food waste disposer door shown in FIG. 7 viewed from the rear, according to an embodiment. And FIG. 10 is a schematic view illustrating a state in which a rear cover is removed in FIG. 9.

According to an example, the rear cover 720 may be disposed at a lower position of a back side of the door 17 (e.g., in −x-axis direction). The rear cover 720 may be detachably coupled to the rear surface 17*e* side of the door 17. When the rear cover 720 is detached from the door 17, part of the structure inside the rear surface 17*e* side of the door 17 may be viewable as illustrated in FIG. 10.

Figure 10:
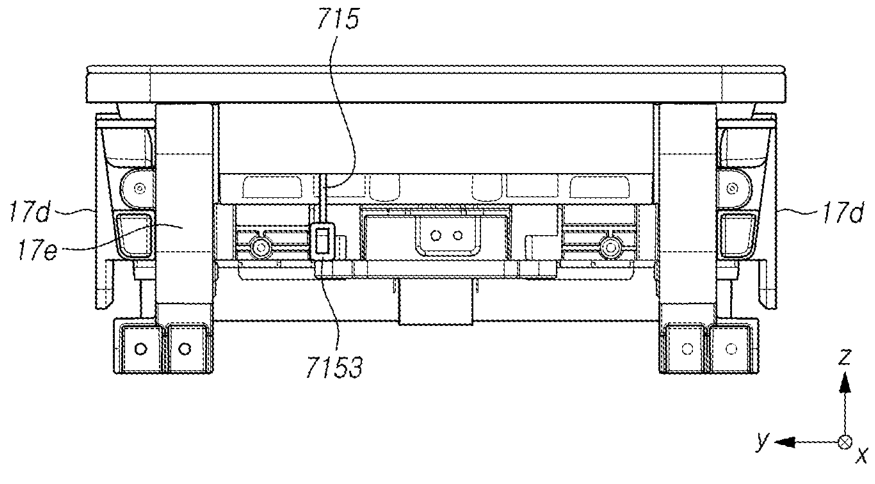
FIG. 10 is a view illustrating a state in which a rear cover is removed in FIG. 9.

As illustrated in FIG. 10, the other end (e.g., the other end 7153 of FIG. 7 or the free end) of the pulling member (e.g., the pulling member 715 of FIG. 7) is disposed to face the rear side of the door 17. As illustrated in FIGS. 9 and 10, the other end 7153 of the pulling member 715 may be arranged to be hidden (not viewable) from the outside by the rear cover 720. In an example, the user may access the pulling member 715 by detaching the rear cover 720. In such a circumstance, in order to manually open the door 17, the user can separate the rear cover 720. When no electric power is applied to the food waste disposer (e.g., the food waste disposer 1 of FIG. 1) or when the door 17 is not automatically opened due to a malfunction of the actuator 714 even in the case of the power being applied, the rear cover 720 may be removed to access the pulling member 715 therethrough, thereby enabling the user to manually open the door 17.

Figure 11:
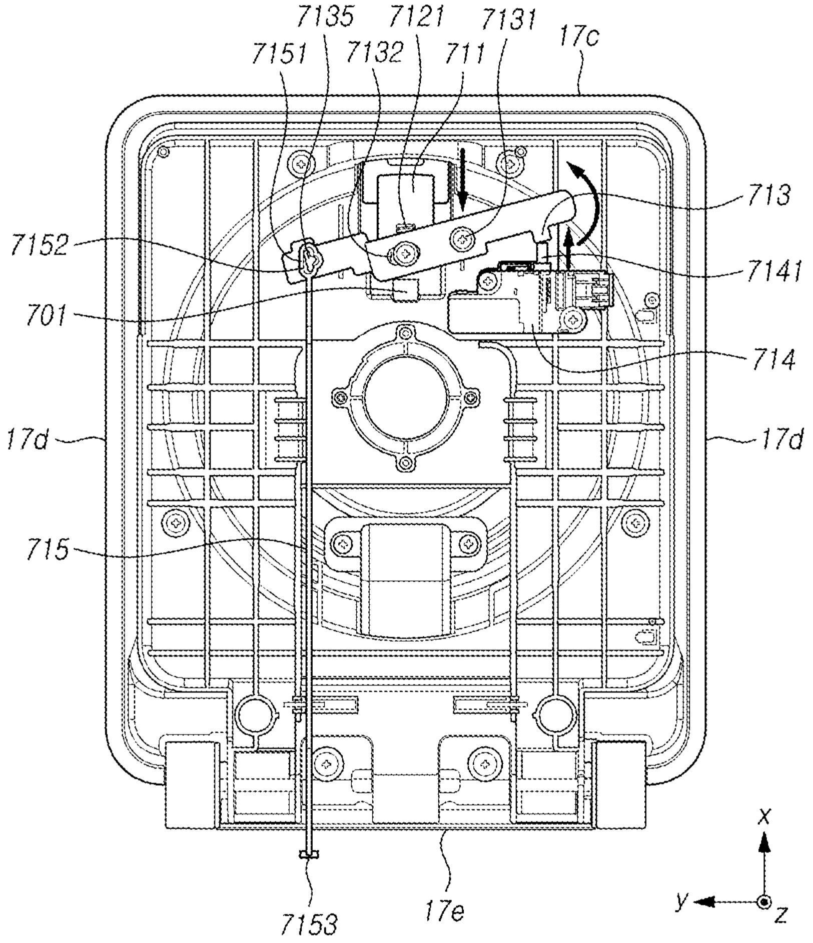
FIG. 11 is a plan view illustrating part of an operation in the case of a door of FIG. 7 being opened by an actuator, according to an embodiment.

FIG. 11 is a plan view illustrating part of an operation state in the case of the door of FIG. 7 being automatically opened by an actuator, according to an embodiment.

According to an example, while the power is properly applied to the food waste disposer (e.g., the food waste disposer 1 of FIG. 1), the door 17 may be automatically opened, for example, by an input obtained from the user. For example, in the case that a signal to open the door 17 is input by an input unit (not shown) positioned on the upper surface of the door 17 while the door 17 is closed, an electrical signal according to the input may be transmitted to the actuator 714. The actuator 714 may then operate to open the door 17. When the actuator 714 is operated, the pressing portion 7141, which has received the power from the actuator 714, may move forward toward the holder lever 713 to press the holder lever 713. The pressing portion 7141 may move forward in +x-axis direction to press the holder lever 713. The pressing portion 7141 may press the support portion 701 formed at a position corresponding to the pressing portion 7141 in the holder lever 713, for example. When the holder lever 713 is pressed by the pressing portion 7141, it may rotate in the first rotation direction (e.g., a counterclockwise direction). The door lever 711 may move backward toward the inside of the door 17 by the holder lever 713 rotated in the first rotation direction. When the door lever 711 moves backward, the door 17 may be opened by releasing the locking of the food waste disposer 1 with the fixing groove (e.g., the fixing groove 113 of FIG. 4).

After the door 17 is opened, the pressing portion 7141 may move backward again to release the pressing of the holder lever 713. When the pressing portion 7141 moves backward, the door lever 711 may move forward by the elastic force of the elastic body 712. By the forward movement of the door lever 711, the holder lever 713 may rotate in the second rotation direction (e.g., a clockwise direction) opposite to the first rotation direction.

Figure 12:
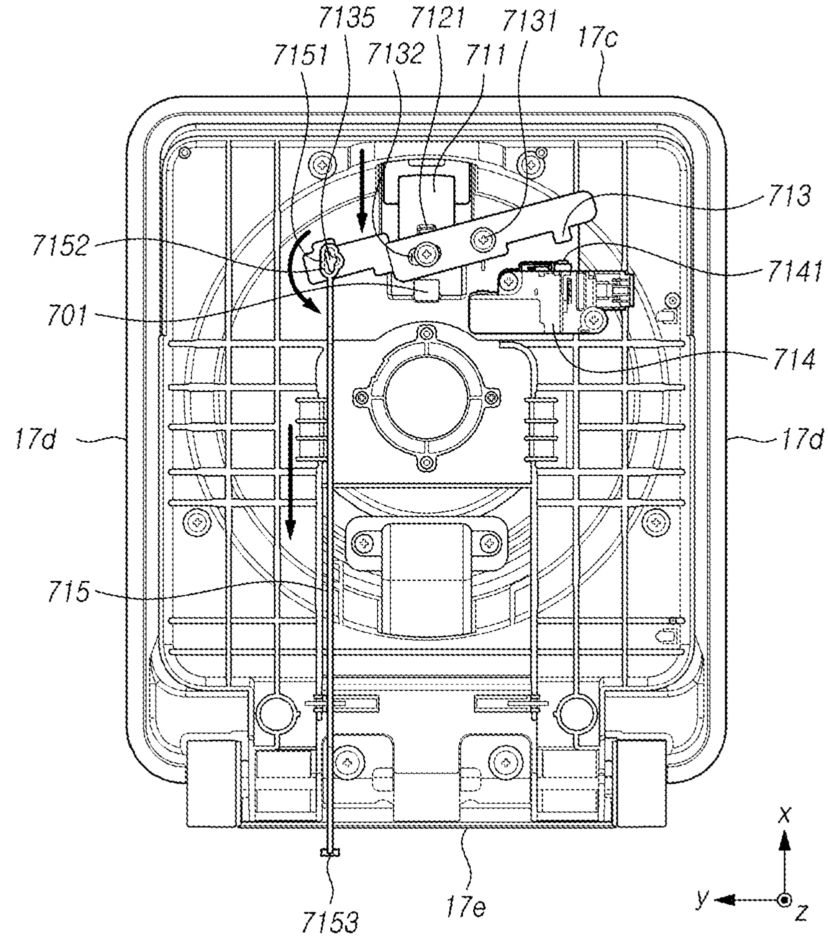
FIG. 12 is a plan view illustrating part of an operation in the case of a door of FIG. 7 being manually opened by applying a physical external force through a pulling member, according to certain embodiments of this disclosure.

FIG. 12 is a plan view illustrating part of an operation in the case of a door of FIG. 7 being manually opened by applying a physical external force through a pulling member, according to an embodiment.

According to an example, the door 17 of the food waste disposer (e.g., the food waste disposer 1 of FIG. 1) may be manually opened by applying a physical external force to the pulling member 715. For example, in the state of the door being closed, the door 17 may be opened by applying a pulling force to pull the pulling member 715 outward. For example, when the pulling member 715 is pulled in −x-axis direction as illustrated, the holder lever 713 may rotate in the first rotation direction (e.g., a counterclockwise direction). The door lever 711 may move backward toward the inside of the door 17 by the holder lever 713 rotated in the first rotation direction. When the door lever 711 moves backward, the coupling of the food waste disposer 1 with the fixing groove (e.g., the fixing groove 113 of FIG. 4) may be released, thereby enabling the user to open the door 17.

When the external force applied to the pulling member 715 is released, the door lever 711 may move forward by the elastic force of the elastic body 712. By the forward movement of the door lever 711, the holder lever 713 may rotate in the second rotation direction (e.g., a clockwise direction) opposite to the first rotation direction.

As described above with reference to FIGS. 7 to 12, it has been illustrated and described that the pressing portion 7141 is disposed as a part of the actuator 714 and moves in +x-axis direction or −x-axis direction according to the driving of the actuator 714, but the disclosure is not limited thereto. According to an example, the pressing portion may be bonded, attached, or adhered to the holder lever 713 to form a part of the holder lever 713. According to an example, the pressing portion may be configured to connect the holder lever 713 and the actuator 714. As described above, even when the pressing portion is configured to connect the holder lever 713 and the actuator 714, the holder lever 713 may be caused to rotate by means of driving of the actuator 714 and applying of an external force (+x-axis direction of force) through the pressing portion according thereto. However, in such a case, the power from the actuator 714 may act to limit the movement of the holder lever 713 through the pressing portion. For example, in the case that the movement of the holder lever 713 is limited by means of the pressing portion, even if an external force is manually applied from the user through the pulling member 715, the holder lever 713 may not rotate due to the force of fixing the movement applied by the actuator 714 to the pressing portion. When the holder lever 713 is not rotated, the door 17 may not be opened even when an external force transmitted through the pulling member 715 is applied. Thus, this operation may prevent the user from inadvertently opening the door 17 manually using the pulling member 715 while the food waste disposer 1 is disposing of the food waste. For example, while the heating operation is performed in the receiving unit (e.g., the receiving unit 121 of FIG. 4), the actuator 714 may fix the movement of the pressing portion, thereby preventing the door 17 from being opened by the pulling member 715.

Figure 13:
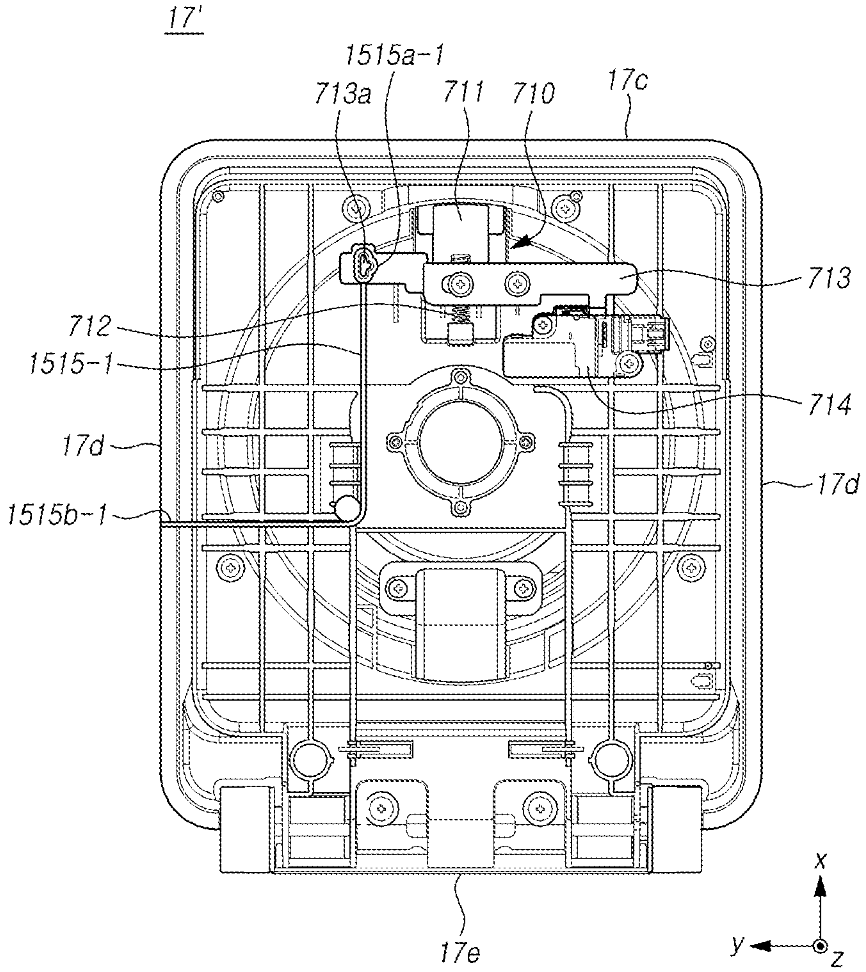
FIG. 13 is a plan view illustrating part of an internal configuration of a door of a food waste disposer according to certain embodiments of this disclosure.
Figure 14:
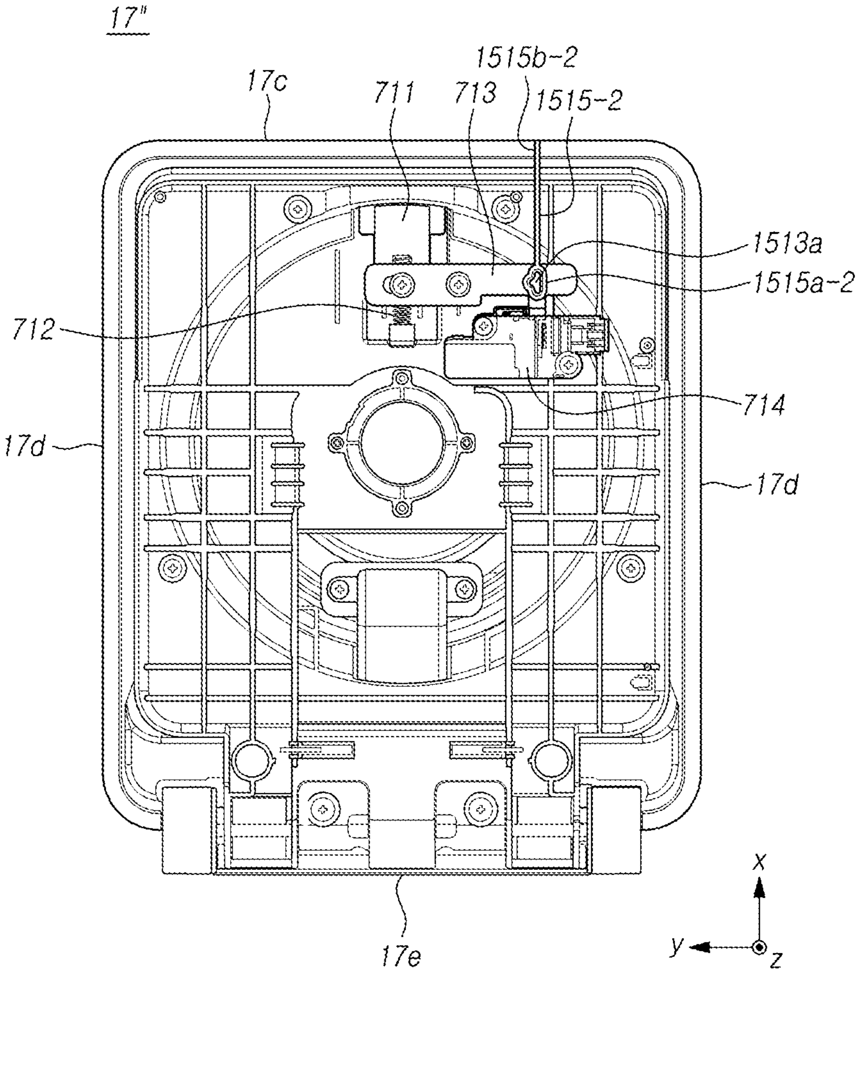
FIG. 14 is a plan view illustrating part of an internal configuration of a door of a food waste disposer according to certain embodiments of this disclosure.

FIG. 13 is a plan view illustrating part of an internal configuration of a door of a food waste disposer according to an embodiment. FIG. 14 is a plan view illustrating part of an internal configuration of a door of a food waste disposer according to an embodiment.

When compared to the door 17 illustrated in FIG. 7, the doors 17' and 17' respectively illustrated in FIGS. 13 and 14 may have generally similar configurations except for the structure and arrangement of the pulling members 1515-1 and 1515-2. Accordingly, with respect to FIGS. 13 and 14, description will be mainly made of the structure and arrangement of the pulling members 1515-1 and 1515-2, and the remaining overlapping descriptions will be omitted for the conciseness of the description. Further, the same reference numerals are used in each of FIGS. 13 and 14 for the same components as those of the door 17 of FIG. 7.

First, referring to FIG. 13, one end **1515*a*-1 of the pulling member 1515-1 may be coupled to a coupling protrusion 713*a* of the holder lever 713, and the other end 1515*b*-1 may extend toward one side surface 17*d* of the door 17'. For example, the pulling member 1515-1 may be configured such that a portion of the pulling member 1515-1 extends from the holder lever 713 in −x-axis direction and the remaining portion of the pulling member 1515-1 extends in +y-axis direction (or −y-axis direction), as illustrated, so that the other end 1515*b*-1 of the pulling member 1515-1 is positioned adjacent to one side surface 17*d* of the door 17'. As another example, the pulling member 1515-1 may be configured to extend slantingly from the holder lever 713 such that the other end 1515*b*-1 of the pulling member 1515-1 is positioned adjacent to one side surface 17*d* of the door 17'. Here, the slanting direction may refer to a direction having both a component in −x-axis direction and a component in +y-axis direction (or a component in −y-axis direction). According to an example, the other end 1515*b*-1 of the pulling member 1515-1 may be configured such that at least a portion thereof protrudes from one side surface 17*d* of the door 17'** and is visible from the outside, but this disclosure is not limited thereto.

Further, referring to FIG. 14, one end **1515*a*-2 of the pulling member 1515-2 may be coupled to a coupling protrusion 1513*a* of the holder lever 713, and the other end 1515*b*-2 thereof may extend toward the front surface 17*c* of the door 17". For example, one end 1515*a*-2 of the pulling member 1515-2 may be positioned adjacent to a portion where the actuator 714 presses the holder lever 713. For example, the pulling member 1515-2 may be configured to extend from the holder lever 713 in the +x-axis direction as illustrated, so that the other end 1515*b*-1 of the pulling member 1515-1 may be positioned adjacent to the front surface 17*c* of the door 17". The user may open the door 17" by pulling the pulling member 1515-2 in +x-axis direction to cause the holder lever 713 to rotate. According to an example, the other end of the pulling member 1515-2 may be configured such that at least a portion thereof protrudes from the front surface 17*c* of the door 17"** and be visible from the outside, but the disclosure is not limited thereto.

In general, a food waste disposer (e.g., the food waste disposer 1 of FIG. 1) may be installed such that its rear surface faces a wall when installed indoors. In such a case, if the other end of the pulling member for manual opening of the door is located behind the door, it may be inconvenient for the user to change the arrangement of the food waste disposer 1 to manually open the door. As illustrated in FIGS. 13 and 14, when the other end of the pulling members 1515-1 and 1515-2 is positioned adjacent to the front surface **17*c* or the side surface 17*d* of the doors 17' and 17", the user may manually open the doors 17' and 17' using the pulling members 1515-1 and 1515-2 without a need to move the food waste disposer 1**.

Figure 15:
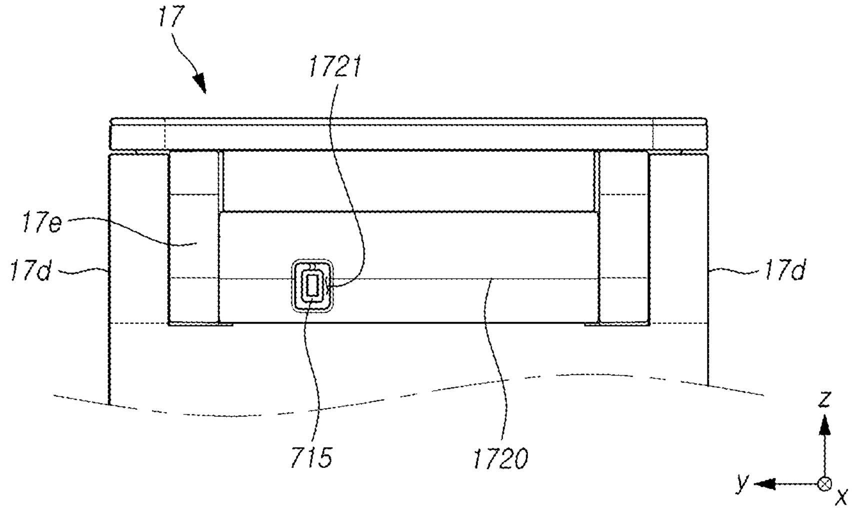
FIG. 15 is a view illustrating the door of a food waste disposer shown in FIG. 7 viewed from the rear, according to certain embodiments of this disclosure.

FIG. 15 is a schematic view illustrating a door of the food waste disposer of FIG. 7 viewed from the rear, according to an embodiment.

Referring to FIG. 15, a rear cover 1720 may be disposed at a rear side of the door 17. The rear cover 1720 may be detachably coupled to a position adjacent to a lower side of the rear surface **17*e* of the door 17. Compared to that shown in FIG. 9, the rear appearance of the door 17 illustrated in FIG. 15 is generally similar except for the shape of the rear cover 1720**.

According to an example, an opening 1721 may be formed in the rear cover 1720 to allow the pulling member 715 to pass therethrough. The opening 1721 may be located, for example, in a direction corresponding to the direction in which the pulling member 715 extends. A portion of the pulling member 715 may protrude outward of the door 17 through the opening 1721 of the rear cover 1720. The portion of the protruding pulling member 715 may be disposed to be visible from the outside. As the portion of the pulling member 715 protrudes to the outside of the door 17, the user may pull the pulling member 715 to open the door 17 manually closed, without suffering the inconvenience of separating the rear cover 1720.

Each embodiment of the disclosure may be used in combination with any other embodiment(s) of the present disclosure.

Although the description disclosed herein is focused on specific embodiments, it should be understood that the disclosure is not limited to such specific embodiments, and all changes, modifications, equivalents, and/or substitutes of various embodiments described herein are encompassed. In conjunction with the description of drawings, similar or like reference numerals may be used to refer to similar or related elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A food waste disposer comprising:

a controller;

a housing including an opening formed on one side of the housing; and a door coupled by a hinge to open or close the opening of the housing, wherein the door includes:

a door lever configured to insert into a fixing groove provided adjacent to the opening of the housing;

a holder lever coupled to the door lever and configured to rotate about a rotation shaft;

a pulling member configured to transmit a physical external force applied from an outside of the housing to the holder lever such that the holder lever rotates about the rotation shaft, wherein one end of the pulling member is connected to the holder lever; and an actuator including a pressing portion configured to generate, based on an input signal from the controller, a force to rotate the holder lever about the rotation shaft.

2. The food waste disposer according to claim 1, wherein:

the door is configured to maintain a closed state of the opening of the housing when the door lever is inserted into the fixing groove and to open the opening of the housing when the door lever is separated from the fixing groove, and the door lever is further configured to insert into or separate from the fixing groove based on a rotation of the holder lever.

3. The food waste disposer according to claim 1, further comprising an elastic body configured to provide an elastic force to the door lever in a direction toward the fixing groove.

4. The food waste disposer according to claim 3, wherein, when the holder lever rotates in a first direction, the elastic body is further configured to contract in a direction away from the fixing groove.

5. The food waste disposer according to claim 1, wherein, in the holder lever, a first portion to which the one end of the pulling member is connected is arranged to be spaced apart from a second portion to which the force generated by the actuator is applied with the rotation shaft interposed therebetween.

6. The food waste disposer according to claim 1, wherein the pulling member is provided such that a portion thereof protrudes to an outside of the door.

7. The food waste disposer according to claim 6, wherein the portion of the pulling member protrudes outward through an opening provided in the door.

8. The food waste disposer according to claim 1, wherein:

the pulling member extends toward an outside of the door, and the door includes a removable rear cover at the outside of the one side of the door, the removable rear cover configured to cover the pulling member so as to conceal the pulling member not exposed to the outside of the housing.

9. The food waste disposer according to claim 1, wherein the controller is configured to control an operation of the actuator to generate the force to rotate the holder lever when the input signal for opening the door is received from the outside of the housing.

10. The food waste disposer according to claim 9, further comprising a temperature sensor configured to sense a temperature of at least a partial area of the housing, wherein the controller is further configured to control an operation of the actuator so as not to generate the force to rotate the holder lever even when the input signal for opening the door is received from the outside of the housing when the temperature measured by the temperature sensor is greater than or equal to a predetermined temperature.

11. A food waste disposer, comprising:

a controller;

a housing including an opening formed on one side of the housing; and a door coupled by a hinge to open or close the opening of the housing, wherein the door includes:

a door lever configured to insert into a fixing groove provided adjacent to the opening of the housing;

a holder lever coupled to the door lever and configured to rotate about a rotation shaft;

a pulling member configured to transmit a physical external force applied from an outside of the housing to the holder lever such that the holder lever rotates about the rotation shaft, wherein one end of the pulling member is connected to the holder lever;

a pressing portion configured to move in a straight line; and an actuator configured to generate, based on an input signal from the controller, a force applied through the pressing portion to rotate the holder lever about the rotation shaft, and wherein the pressing portion is configured to connect the holder lever and the actuator.

12. The food waste disposer according to claim 11, wherein the actuator is further configured to generate the force applied to the holder lever through the pressing portion so as to prevent the holder lever from rotating about the rotation shaft.

13. The food waste disposer according to claim 12, further comprising a temperature sensor configured to sense a temperature in at least a partial area of the housing, wherein the actuator is further configured to generate the force while the temperature measured by the temperature sensor is greater than or equal to a predetermined temperature.

14. The food waste disposer according to claim 11, wherein the actuator is further configured to generate the force applied to the holder lever through the pressing portion in order to rotate the holder lever when the input signal for opening the door is received from the outside of the housing.

15. The food waste disposer according to claim 11, further comprising a temperature sensor configured to sense a temperature in at least a partial area of the housing, wherein the actuator is further configured to generate the force applied to the holder lever through the pressing portion in order to rotate the holder lever when the input signal for opening the door is received from the outside of the housing and the temperature measured by the temperature sensor is less than a predetermined temperature.

16. A food waste disposer comprising:

a controller;

a housing having an opening formed on one side thereof; and a door coupled by a hinge to open or close the opening of the housing, wherein the door includes:

a door lever configured to insert into a fixing groove provided adjacent to the opening of the housing, a holder lever coupled to the door lever and configured to rotate about a rotation shaft, a pulling member configured to transmit a physical external force applied from an outside of the housing to the holder lever such that the holder lever rotates about the rotation shaft, wherein one end of the pulling member is connected to the holder lever, a pressing portion configured to move in a straight line, and an actuator configured to generate, based on an input signal from the controller, a force applied through the pressing portion to rotate the holder lever about the rotation shaft, wherein the pressing portion is configured to connect the holder lever and the actuator.

17. The food waste disposer of claim 16, wherein the actuator is further configured to generate the force to the holder lever through the pressing portion so as to prevent the holder lever from rotating about the rotation shaft.

18. The food waste disposer of claim 16, further comprising:

a temperature sensor configured to sense a temperature in at least a partial area of the housing, wherein the actuator is further configured to generate the force while the temperature measured by the temperature sensor is greater than or equal to a predetermined temperature.

19. The food waste disposer of claim 16, wherein the actuator is further configured to generate the force to the holder lever through the pressing portion in order to rotate the holder lever when the input signal for opening the door is received from the outside of the housing.

20. The food waste disposer of claim 16, further comprising:

a temperature sensor configured to sense a temperature in at least a partial area of the housing, wherein the actuator is further configured to generate the force applied through the pressing portion in order to rotate the holder lever when the input signal for opening the door is received from the outside of the housing and the temperature measured by the temperature sensor is less than a predetermined temperature.

* * * * *